No. 785,948. PATENTED MAR. 28, 1905.
M. HENDRICKSON.
POWER TRANSMISSION MECHANISM.
APPLICATION FILED APR. 4, 1904.
3 SHEETS—SHEET 1.
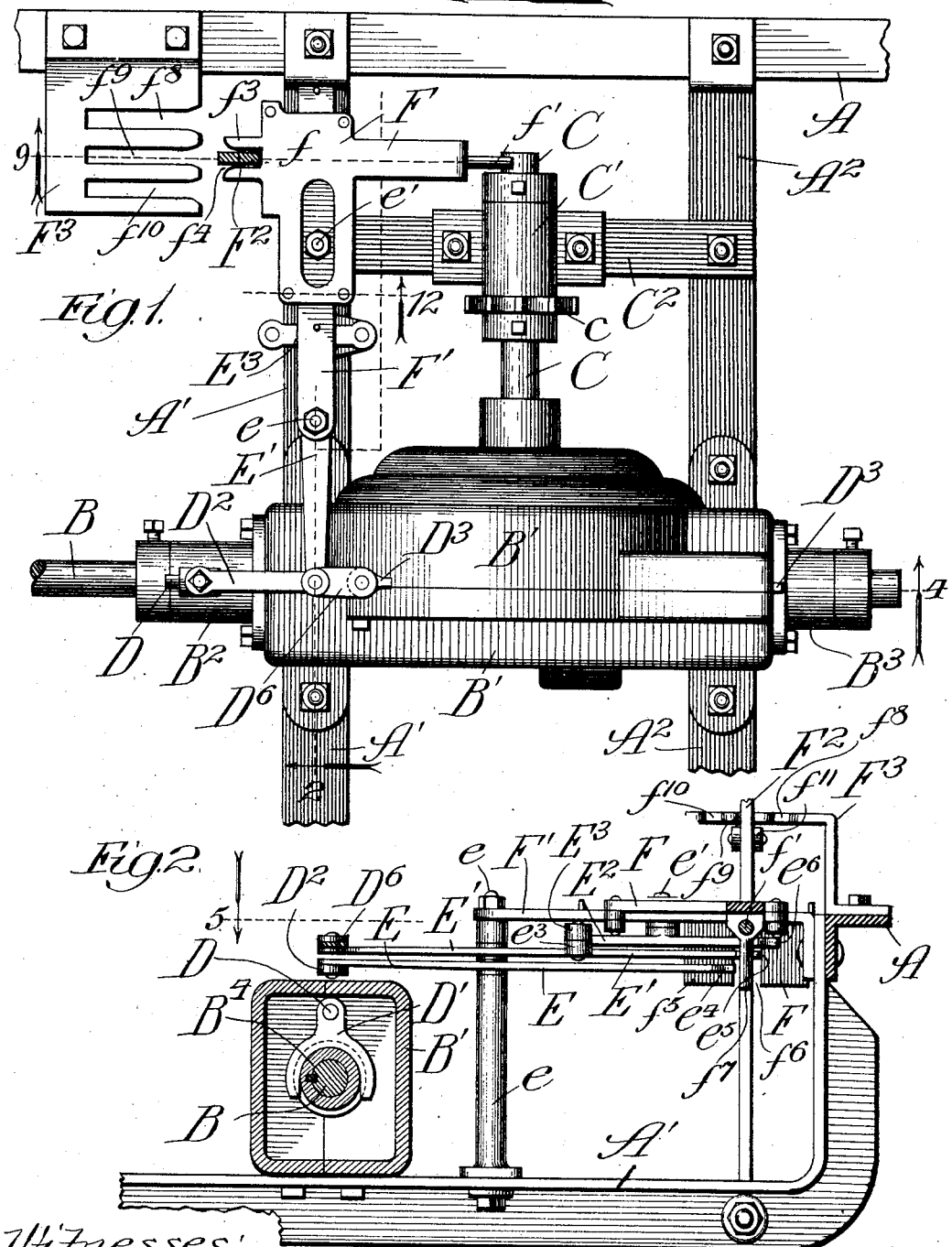

No. 785,948. PATENTED MAR. 28, 1905.
M. HENDRICKSON.
POWER TRANSMISSION MECHANISM.
APPLICATION FILED APR. 4, 1904.

3 SHEETS—SHEET 2.

Witnesses:
Inventor:
Magnus Hendrickson
By Dyrenforth, Dyrenforth & Lee,
Attys.

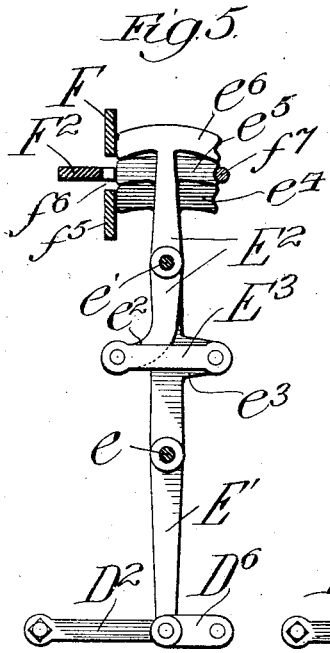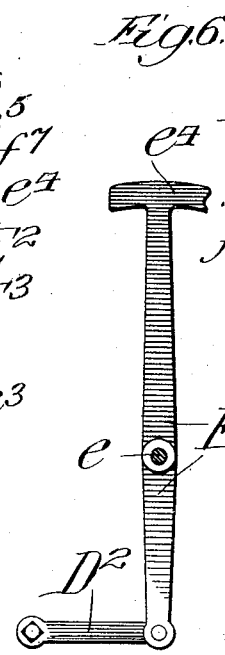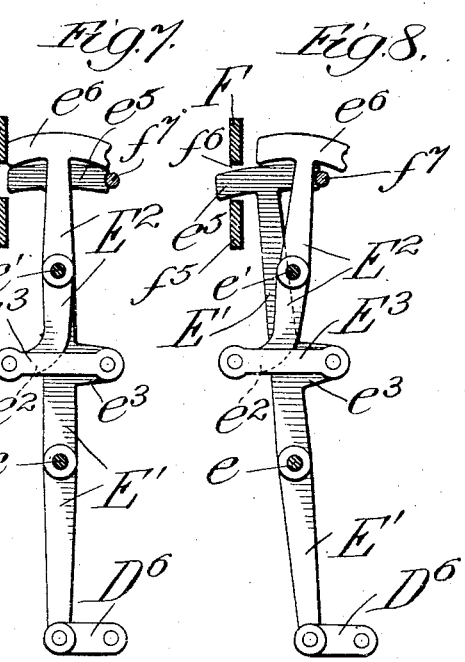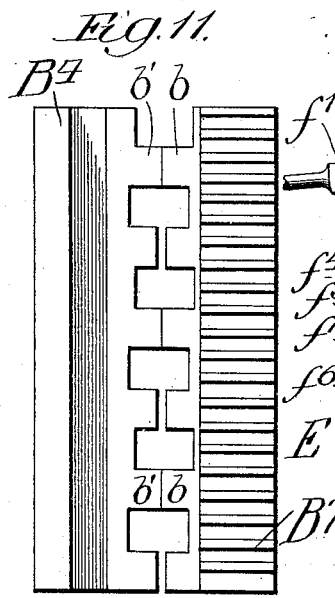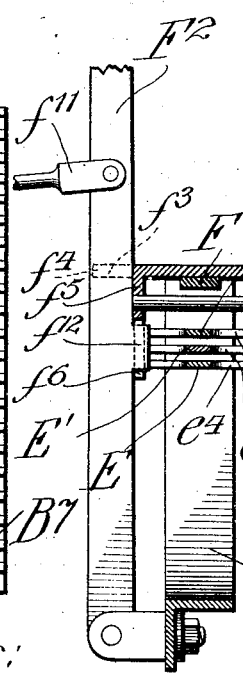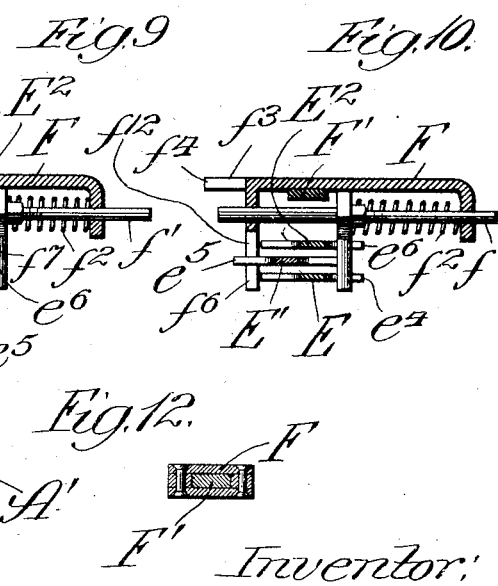

No. 785,948. Patented March 28, 1905.

UNITED STATES PATENT OFFICE.

MAGNUS HENDRICKSON, OF CHICAGO, ILLINOIS, ASSIGNOR TO JACOB LAUTH, OF CHICAGO, ILLINOIS.

POWER-TRANSMISSION MECHANISM.

SPECIFICATION forming part of Letters Patent No. 785,948, dated March 28, 1905.

Application filed April 4, 1904. Serial No. 201,428.

*To all whom it may concern:*

Be it known that I, MAGNUS HENDRICKSON, a citizen of the United States, residing at Chicago, in the county of Cook and State of Illinois, have invented a new and useful Improvement in Power-Transmission Mechanism, of which the following is a specification.

My invention relates particularly to power-transmission mechanism for motor-vehicles; and my primary object is to provide simplified mechanism of the character mentioned by means of which danger from loss of presence of mind on the part of the operator is reduced to a minimum.

Other objects of my invention will appear from the description hereinafter given.

In the construction hereinafter described in detail I employ a plurality of clutch-shifting levers which serve to shift the clutches pertaining to the speed and reversing gear mechanism, a shiftable lever-controller coacting with said levers and equipped with means for preventing the actuation of all but the desired lever and equipped also with means for actuating any desired lever in one direction to throw the corresponding clutch into operative engagement, and a controller-shifting hand-lever capable of swinging in a longitudinal plane and also in a transverse plane, the transverse movement determining the position of said controller, and, therefore, which clutch-shifting lever is to be actuated, and the longitudinal movement permitting when the hand-lever is swung forwardly the actuation of the proper clutch-shifting lever by said controller and serving when the hand-lever is swung rearwardly to retract said clutch-shifting lever.

My invention is illustrated in its preferred embodiment in the accompanying drawings, in which—

Figure 3:
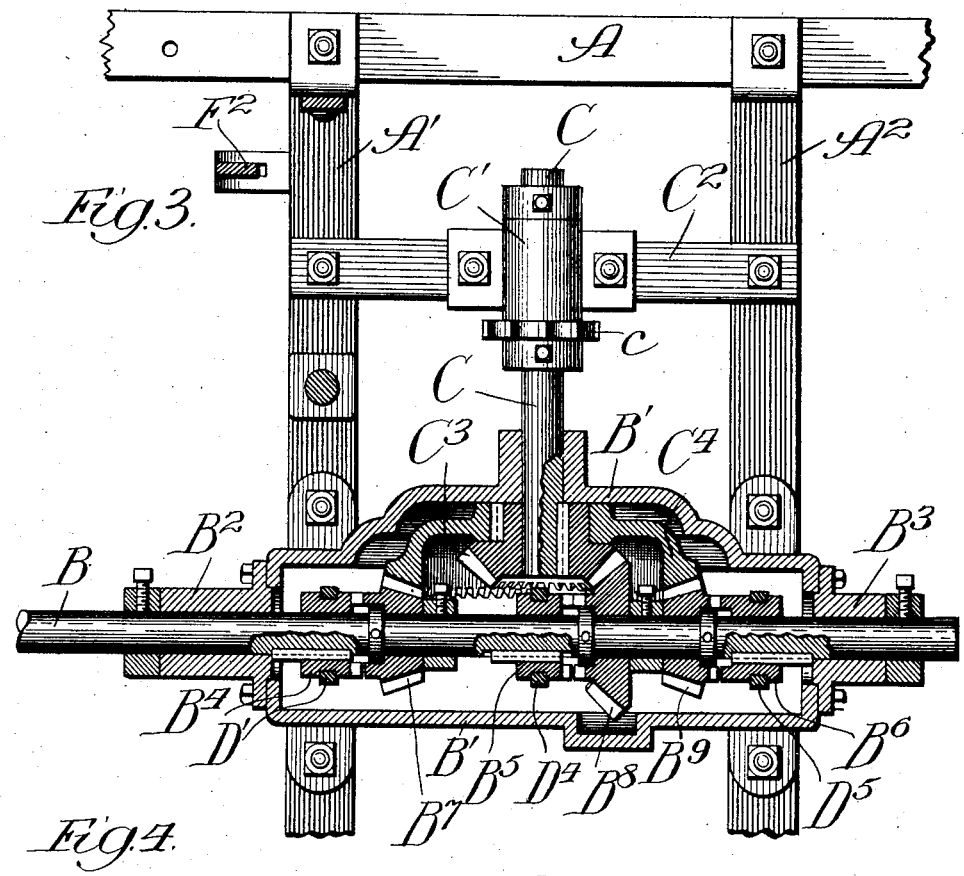
Figure 4:
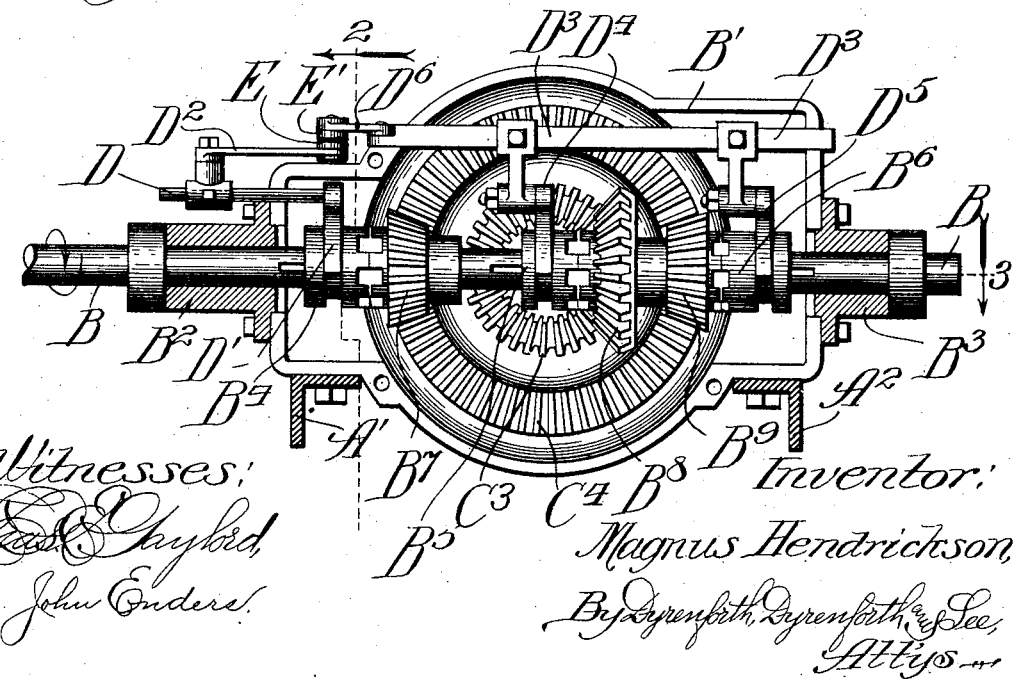

Figure 1 represents a broken plan view of the running-gear of a motor-vehicle equipped with my improvements, the large arrow pointing toward the front end of the machine; Fig. 2, a broken transverse sectional view taken as indicated at line 2 of Figs. 1 and 4 and looking toward the front end of the machine; Fig. 3, a plan sectional view taken as indicated at line 3 of Fig. 4; Fig. 4, a longitudinal sectional view taken as indicated at line 4 of Fig. 1; Fig. 5, a broken plan section taken as indicated at line 5 of Fig. 2 and showing certain clutch-shifting levers; Fig. 6, a similar view showing the lower one of the levers shown in Fig. 5; Fig. 7, a similar view showing the upper one of the levers shown in Fig. 5, the same being a compound lever; Fig. 8, a similar view showing the position of the compound lever changed; Fig. 9, a vertical longitudinal section taken as indicated at line 9 of Fig. 1; Fig. 10, a similar section showing certain parts omitted; Fig. 11, a development of certain clutch members employed, and Fig. 12 a section taken as indicated at line 12 of Fig. 1.

A description of the preferred construction is as follows:

A represents a fragment of the running-gear frame having the cross members A' A², comprising angle-bars having their top flanges turned toward each other; B, a longitudinal rotary shaft actuated from the engine (not shown) at the front end of the machine, preferably through the medium of a friction-clutch, (not shown;) B', a gear-casing supported on the members A' A² and comprising members separable at a longitudinal plane and provided with bearings B² B³ for the shaft B; B⁴, B⁵, and B⁶, clutch members splined upon the shaft B and shiftable longitudinally thereof; B⁷, B⁸, and B⁹, bevel-gears journaled upon the shaft B and suitably confined against longitudinal movement with relation thereto, said gears being equipped at their hubs with clutch members coacting with the clutch members B⁴ B⁵ B⁶, respectively; C, a transversely-extending sprocket-shaft journaled in one side of the casing B' and in a bearing C', supported by a member C², secured on the transverse members A' A²; C³, a bevel-gear fixed on the shaft C and meshing with the gear B⁸; C⁴, a larger bevel-gear fixed on the hub of the gear C³ and meshing at its front portion with the gear B⁷ and at its rear portion with the gear B⁹; D, Figs. 1 and 4, a longitudinally-movable clutch-shifting rod equipped with a yoke D', engaging the clutch member B⁴, said rod having connected therewith an actuating-link $D^2$; $D^3$, a longitudinally-movable clutch-shifting bar equipped with yokes $D^4$ $D^5$, engaging, respectively, the clutch members $B^5$ $B^6$, said bar $D^3$ having connected with the front end thereof a shifting-link $D^6$; E, a transversely-extending lever having its left-hand end, Fig. 2, connected with the free end of the link $D^2$; E', a parallel lever located just above the lever E and connected at one end with the link $D^6$; $E^2$, a relatively short lever connected with the lever E' by a link $E^3$ and constituting therewith a compound lever; F, a transversely-movable lever-controller mounted on a guide F', supported on the member A'; $F^2$, a controller-shifting hand-lever capable of swinging both in longitudinal and transverse planes, and $F^3$ a stationary guard for said hand-lever.

Any suitable friction-clutch may be employed at the engine for communicating motion to the shaft B, and where such a clutch is employed it preferably is controlled by a rod connected with the hand-lever $F^2$. Any desired arrangement of the speed and reversing gear mechanism may be employed. In the construction shown the shaft B extends longitudinally through the casing B', and the shaft C is perpendicular to and has one end adjacent to the shaft B, at about the center of said casing. The gear $C^3$ is fixed on the adjacent end of the shaft C and meshes with the gear $B^8$, and the gear $C^4$ is fixed on the hub of the gear $C^3$ within the gear-casing and is suitably dished to enable it to engage the gears $B^7$ $B^9$, which face each other. The clutch members $B^5$ $B^6$ have teeth extending toward each other, so that when the bar $D^3$ is shifted in one direction one of said clutch members is brought into operative engagement with the corresponding gear and when said bar $D^3$ is shifted in the opposite direction the other one of said clutch members is brought into engagment with the corresponding gear. The gear-casing is provided with suitable guides for the rod D and bar $D^3$. A detail of the construction of the clutch members employed within the casing B' is shown in Fig. 11, which shows the gear $B^7$, for instance, provided with lateral teeth $b$ of substantially square cross-section and the clutch member $B^4$ provided with similarly-shaped teeth $b'$. The teeth of each member are alternately long and short, as shown, the result of this construction being to enable the clutch members to be readily thrown into interlocking engagement.

The shaft C is shown equipped with a sprocket-wheel $c$, through the medium of which power may be transmitted to the differential-gear mechanism on the driving-axle of the vehicle.

Any suitable construction for the yoke-actuating members D $D^3$ and the attendant parts may be employed, and it is unnecessary to describe these parts with more particularity.

The levers E and E' are pivotally supported on a post $e$ rising from the member A'. The short lever $E^2$ is supported near its center on a stationary pivot $e'$ and has one end curved, as shown at $e^2$, and connected with one end of the link $E^3$. The other end of said link is connected with a lug $e^3$ on the lever E' and to the right of the pivoted point thereof, Fig. 2. The free ends of the levers E E' $E^2$ are equipped, respectively, with segmental heads $e^4$ $e^5$ $e^6$, which lie in different longitudinal planes, as shown in Fig. 2. The rear end of each of said segmental heads is slightly grooved for engagement with an actuating-stud with which the lever-controller F is equipped. The device F comprises a transversely-movable slide $f$, mounted on the guide F'; a lever-actuating plunger $f'$, movable longitudinally with relation to the vehicle-body, and a spring $f^2$, serving to force said plunger forwardly, thereby to cause it to actuate the appropriate clutch-shifting lever after the slide $f$ has been preparatorily shifted by the hand-lever $F^2$. The slide $f$ is provided with a forwardly-projecting lug $f^3$, equipped with a slot $f^4$ for receiving the hand-lever. Said slide is provided also with a downwardly-projecting flange $f^5$, which is equipped with a slot $f^6$, which may be entered by any of the segmental lever-heads mentioned, according to the position of the slide $f$. The plunger $f'$ is equipped with a downwardly-extending finger or stud $f^7$, which serves to engage the appropriate lever-head, according to the position of the slide $f$. The guard $F^3$, as shown in Fig. 1, is located adjacent to the lug $f^3$ of the slide and is provided with a plurality of slots $f^8$ $f^9$ $f^{10}$, which correspond with the several positions of the lever-controller. The hand-lever $F^2$ may enter either one of these slots, according to the position of the controller. The lever $F^2$ has connected with it a forwardly-extending rod $f^{11}$, which connects with the clutch mechanism (not shown) at the engine. (Not shown.) When the hand-lever is swung rearwardly to retract the clutch-shifting lever at the speed and reversing gear mechanism which happens to be in use, the rod $f^{11}$ serves to disconnect the clutch at the engine, and when the hand-lever is swung forwardly to permit the plunger $f'$ to actuate a clutch-shifting lever the rod $f^{11}$ serves to throw the clutch at the engine into engagement again. The hand-lever is provided at its rear edge with a lug $f^{12}$, which serves to enter the slot $f^6$ and engage the head of the clutch-shifting lever which happens to be in use, thereby to cause the same to clear the slot $f^6$ and permit the controller to be shifted.

The operation will be readily understood from the foregoing detailed description. When the hand-lever is in a position wholly in the rear of the guard F³, the clutches are all out of operative engagement. When it is desired to employ the slow speed forward, this may be accomplished by shifting the bar D³ forward, which in turn may be accomplished by shifting the controller F so that its slot $f^4$ registers with the slot $f^8$ of the hand-lever guard and then pushing the hand-lever forward into the slot $f^8$, thereby permitting the plunger $f'$ to operate, through the medium of the finger $f^7$, upon the lever E². When the finger $f^7$ is in position to engage the head $e^6$ on the lever E², the slot $f^6$ in the flange $f^5$ of the controller-slide $f'$ is in position to receive the head $e^6$, while the flange $f^5$ serves to prevent forward movement of the heads of the other two levers. When the lever E² is actuated through the medium of the plunger, it serves to throw the right-hand end of the lever E' rearwardly, thereby drawing the link D⁶ forwardly and causing the clutch member B⁶ to engage the corresponding clutch member on the gear B⁹. When it is desired to change from slow speed forward to fast speed forward, this may be accomplished by withdrawing the hand-lever from the slot $f^8$ and shifting the controller to its intermediate position and then advancing the hand-lever into the slot $f^9$ of the guard. When the hand-lever is retracted preparatory to shifting the controller, it retracts the plunger $f'$ and also retracts the head of the lever E². When the hand-lever is advanced into the slot $f^9$ of the guard, the plunger operates to force the head of the lever E' forwardly, the slide at this time being properly located to enable the head of said lever to enter the slot $f^6$. When it is desired to reverse the machine, the hand-lever is withdrawn from the slot $f^9$ of the guard and moved laterally into alinement with the slot $f^{10}$ of the guard and then thrust forwardly into the said last-named slot. The last-mentioned shifting movement brings the controller into position to enable the plunger $e'$ to thrust the head of the lever E forward, thereby drawing the link D² rearwardly and throwing the clutch member B⁴ into engagement with the gear B⁷. At each forward movement of the hand-lever F² the clutch at the engine is operated to cause the shaft B to rotate, and at each rearward movement of the hand-lever said clutch is operated to release said shaft B. It is obvious that the controller can be shifted at will to enable the hand-lever to enter any one of the slots of the guard. Moreover, it will be understood that it is impossible to shift the controller for the purpose of causing a fresh set of gears to operate without first disconnecting the set which chances to be in use.

When the members of a given clutch are brought together, the clutch-teeth are caused to operate almost instantaneously, owing to the fact that by means of the alternately long and short tooth arrangement ample time is allowed to enable the teeth to interlock. This overcomes the great objection which has heretofore existed to the use of clutch members of the same general character, due to the slippage incident to an effort to cause the clutch-teeth to interlock. Moreover, the expedient provides against injury to the teeth, inasmuch as it enables substantial engagement of the teeth at the moment when the first operative engagement occurs. The sockets between the teeth are alternately deep and shallow, providing for perfect interlocking when the clutch members are in engagement.

While I have for clearness shown and described a complete transmission mechanism, the specific gear construction and the specific clutch construction herein shown are claimed in divisional applications.

It is to be remarked that the shifting mechanism described may be employed to shift power-transmission members of any form regardless of whether they are clutches, toothed gears, or friction-gears.

It will be understood that many changes in details of construction within the spirit of my invention may be made. Hence no undue limitation should be understood from the foregoing detailed description.

What I regard as new, and desire to secure by Letters Patent, is—

1. In mechanism of the character described, the combination of a plurality of members for shifting power-transmission members, and controlling means therefor, including a spring-actuated device serving when moving under the action of the spring to operate any selected one of said first-named members, for the purpose set forth.

2. In mechanism of the character described, shifting means comprising a plurality of levers, a shiftable controller provided with means for actuating any selected lever in one direction, and a controller-shifting lever serving to retract the selected lever and shift the controller, for the purpose set forth.

3. In mechanism of the character described, shifting means comprising a plurality of levers, a shiftable lever-controller equipped with spring-actuated means for automatically actuating any selected lever in one direction, and a hand-lever having a compound movement and serving to retract the automatically-actuated lever in one movement and to shift the controller in another movement, for the purpose set forth.

4. In mechanism of the character described, shifting means comprising a plurality of shifting members for shifting clutch members or the like, a controller equipped with spring-actuated means serving when moving under the action of its spring to operate said shifting members, a hand-lever mounted to swing toward and away from said controller and transversely to shift the controller, and a guard located adjacent to said hand-lever and provided with a plurality of sockets for receiving the same, for the purpose set forth.

5. In mechanism of the character described, shifting means comprising a plurality of levers having heads located in different planes, a shiftable controller equipped with a spring-actuated plunger having means for engaging any one of said heads according to the position of the controller, and a hand-lever capable of swinging in a plane parallel with said plunger and operating to retract the clutch-shifting lever which chances to be in use and capable of swinging in a plane perpendicular to said plunger to shift the controller when said plunger is retracted, for the purpose set forth.

6. In mechanism of the character described, shifting means comprising levers, a lever-controller comprising a slide constituting a guard for the levers, and a spring-actuated member serving to engage any selected lever, according to the position of the slide, and, when moving under the action of its spring, to operate the selected lever, and a hand-lever acting in opposition to said spring-actuated member and serving also to shift said controller, for the purpose set forth.

7. In mechanism of the character described, the combination of a shaft, power-transmission members movable longitudinally with relation thereto, levers extending transversely with relation to said shaft and connected with said power-transmission members, a controller shiftable transversely with relation to said shaft and equipped with lever-actuating means, and a hand-lever coacting with said controller and equipped with lever-retracting means, for the purpose set forth.

8. In mechanism of the character described, the combination of a lever connected with a stationary pivot, and serving to shift a power-transmission member, a second lever connected with said first-named lever and with a stationary pivot, a shiftable lever-controller equipped with means for actuating either one of said levers, according to the position of the controller, and a hand-lever coacting with said controller and equipped with lever-controlling means, for the purpose set forth.

9. In mechanism of the character described, the combination of a shaft, power-transmission members movable longitudinally thereof, a plurality of superposed levers extending transversely with relation to said shaft and provided with heads lying in different planes parallel with said shaft, a lever-controller equipped with a spring-actuated lever-actuating member, and a hand-lever pivoted to swing in two planes and serving to shift said controller and equipped with lever-retracting means, for the purpose set forth.

10. In mechanism of the character described, the combination of a shaft, power-transmission members movable longitudinally thereof, a plurality of superposed levers extending transversely with relation to said shaft and provided with heads lying in different planes parallel with said shaft, a lever-controller equipped with a spring-actuated lever-actuating member, a hand-lever pivoted to swing in two planes and serving to shift said controller and equipped with lever-retracting means, and a guard provided with a plurality of sockets for said hand-lever.

11. A lever-controller comprising a slide having a slot for receiving a controller-shifting lever and a slot for receiving the arm of a clutch-shifting lever, and a spring-actuated member equipped with means for engaging a clutch-shifting lever, for the purpose set forth.

MAGNUS HENDRICKSON.

In presence of—
F. M. WIRTZ,
WALTER N. WINBERG.